(12) United States Patent
Hoshio

(10) Patent No.: US 9,348,250 B2
(45) Date of Patent: May 24, 2016

(54) CHARGING ROLLER, PROCESS CARTRIDGE, AND MANUFACTURING METHOD OF CHARGING ROLLER

(71) Applicant: FUJI XEROX CO., LTD., Tokyo (JP)

(72) Inventor: Takuro Hoshio, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/505,921

(22) Filed: Oct. 3, 2014

(65) Prior Publication Data

US 2015/0355565 A1 Dec. 10, 2015

(30) Foreign Application Priority Data

Jun. 6, 2014 (JP) .................................. 2014-117630

(51) Int. Cl.
| | |
|---|---|
| *G03G 15/02* | (2006.01) |
| *B29C 47/02* | (2006.01) |
| *B29C 47/00* | (2006.01) |
| *B29L 31/32* | (2006.01) |
| *B29K 705/08* | (2006.01) |
| *B29K 507/04* | (2006.01) |
| *B29K 63/00* | (2006.01) |
| *B29L 31/00* | (2006.01) |

(52) U.S. Cl.
CPC ........ *G03G 15/0233* (2013.01); *B29C 47/0016* (2013.01); *B29C 47/025* (2013.01); *B29K 2063/00* (2013.01); *B29K 2507/04* (2013.01); *B29K 2705/08* (2013.01); *B29L 2031/324* (2013.01); *B29L 2031/767* (2013.01)

(58) Field of Classification Search
None
See application file for complete search history.

(56) References Cited

U.S. PATENT DOCUMENTS

| | | | | |
|---|---|---|---|---|
| 3,923,947 | A * | 12/1975 | Cook | B29C 47/0004 264/141 |
| 5,597,652 | A * | 1/1997 | Utsunomiya | G03G 15/0233 428/340 |
| 5,753,154 | A * | 5/1998 | Hayashi | B29C 44/0461 156/79 |
| 9,046,805 | B1 * | 6/2015 | Tomari | G03G 15/0233 |
| 9,141,018 | B2 * | 9/2015 | Tomari | G03G 15/0233 |
| 9,280,079 | B1 * | 3/2016 | Hoshio | G03G 15/0233 |
| 2002/0086125 | A1 * | 7/2002 | Kakii | G03G 15/0233 428/36.91 |
| 2004/0062940 | A1 * | 4/2004 | Miyamori | G03G 15/0233 428/492 |
| 2005/0029693 | A1 * | 2/2005 | Noda | G03G 15/0233 264/46.9 |
| 2006/0280928 | A1 * | 12/2006 | Imasaka | B29C 44/08 428/304.4 |
| 2008/0107451 | A1 * | 5/2008 | Nukada | G03G 15/0233 399/176 |

(Continued)

FOREIGN PATENT DOCUMENTS

| | | |
|---|---|---|
| JP | B1-3118639 | 12/2000 |
| JP | A-2006-208447 | 8/2006 |

(Continued)

*Primary Examiner* — David Gray
*Assistant Examiner* — Geoffrey Evans
(74) *Attorney, Agent, or Firm* — Oliff PLC

(57) ABSTRACT

A charging roller includes a conductive base material, a conductive adhesive layer that has a gel fraction equal to or greater than 50% on an outer circumferential surface of the base material, and a conductive elastic layer on the adhesive layer.

16 Claims, 5 Drawing Sheets

(56) References Cited

U.S. PATENT DOCUMENTS

| | | | | |
|---|---|---|---|---|
| 2008/0128076 A1* | 6/2008 | Nimura | B29B 17/02 | 156/247 |
| 2009/0067874 A1* | 3/2009 | Hoshio | G03G 15/0225 | 399/100 |
| 2010/0104316 A1* | 4/2010 | Hoshio | G03G 15/0233 | 399/100 |
| 2010/0247149 A1* | 9/2010 | Hoshio | G03G 15/0233 | 399/176 |
| 2011/0052262 A1* | 3/2011 | Tomari | B32B 25/04 | 399/176 |
| 2013/0064984 A1* | 3/2013 | Iida | B29C 47/025 | 427/430.1 |
| 2013/0251406 A1* | 9/2013 | Hoshio | G03G 15/0233 | 399/176 |
| 2014/0221183 A1* | 8/2014 | Miyagawa | G03G 15/02 | 492/18 |
| 2014/0274628 A1* | 9/2014 | Matsuda | G03G 15/0208 | 492/18 |
| 2015/0050052 A1* | 2/2015 | Hoshio | G03G 15/0216 | 399/176 |
| 2015/0331346 A1* | 11/2015 | Yamauchi | G03G 15/00 | 492/18 |
| 2016/0026118 A1* | 1/2016 | Matsukawa | G03G 15/095 | 399/149 |

FOREIGN PATENT DOCUMENTS

| | | |
|---|---|---|
| JP | A-2007-108319 | 4/2007 |
| JP | B2-4731914 | 7/2011 |

\* cited by examiner

CHARGING ROLLER, PROCESS CARTRIDGE, AND MANUFACTURING METHOD OF CHARGING ROLLER

CROSS-REFERENCE TO RELATED APPLICATIONS

This application is based on and claims priority under 35 USC 119 from Japanese Patent Application No. 2014-117630 filed Jun. 6, 2014.

BACKGROUND

1. Technical Field

The present invention relates to a charging roller, a process cartridge, and a manufacturing method of a charging roller.

2. Related Art

In an electrophotographic image forming apparatus, first, a charge is formed on a surface of an image holding member formed of a photoconductive photoreceptor including an inorganic or organic material by using a charging device, an electrostatic latent image is formed with a laser beam or the like obtained by modulating an image signal, and then the electrostatic latent image is developed to be visualized with charged toner to form a toner image. The toner image is electrostatically transferred to a transfer member such as a recording sheet or the like, directly or through an intermediate transfer body, and is fixed onto a recording material, and a reproduced image is obtained.

SUMMARY

According to an aspect of the invention, there is provided a charging roller including:
a conductive base material;
a conductive adhesive layer that has a gel fraction equal to or greater than 50% on an outer circumferential surface of the base material; and
a conductive elastic layer on the adhesive layer.

BRIEF DESCRIPTION OF THE DRAWINGS

Exemplary embodiments of the present invention will be described in detail based on the following figures, wherein.

DETAILED DESCRIPTION

Figure 1:
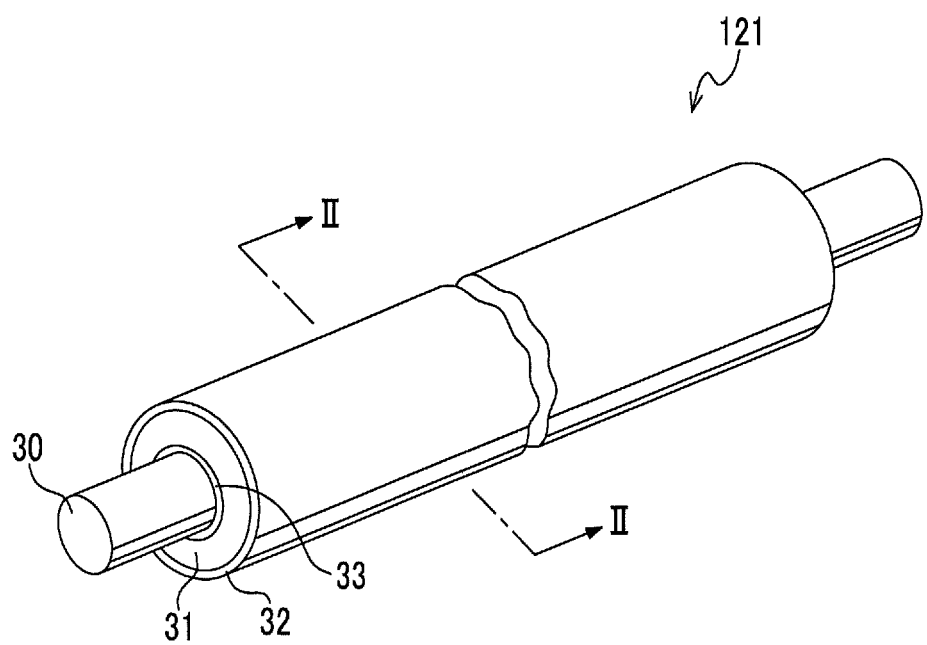
FIG. 1 is a schematic perspective view showing a charging roller according to the exemplary embodiment.

Hereinafter, exemplary embodiments of the invention will be described in detail.

Charging Roller and Manufacturing Method of the Same

A charging roller according to the exemplary embodiment includes a conductive base material, a conductive adhesive layer on an outer circumferential surface of the base material, and a conductive elastic layer on the adhesive layer. A gel fraction of the adhesive layer is equal to or greater than 50%.

When manufacturing the charging roller, as a method of forming an elastic layer on a cylindrical base material, an extrusion method of extruding the base material coated with an adhesive in advance with a material for the elastic layer, while inserting the base material into a supply path having a smaller inner diameter than an outer diameter of the base material including the adhesive layer, by a molding apparatus such as an extruder including a cross head is used.

However, when the base material and the material for the elastic layer are extruded to pass through the supply path, core misalignment occurs with the cylindrical base material deviated from the center of the supply path in some cases, and accordingly unevenness in film thickness (uneven thickness) may occur with different film thicknesses of the elastic layer depending on the locations.

When the charging roller having unevenness in film thickness (uneven thickness) is used for charging of an image holding member of an image forming apparatus, unevenness in a charging state of the image holding member may occur, and as a result, an image defect may occur.

In addition, in order to prevent the core misalignment, it is considered to narrow a width of the supply path for supplying the base material to the cross head, but in this case, interference of the adhesive layer formed on the outer circumferential surface of the base material occurs, and peeling of the adhesive layer may occur.

With respect to this, with the charging roller according to the exemplary embodiment, the gel fraction of the adhesive layer is controlled to be in the range described above, that is, gelation and toughening are performed. Accordingly, when supplying the base material including the adhesive layer from the supply path in the extrusion molding machine, the base material is caused to pass through the supply path having a smaller diameter than an outer diameter of the base material including the adhesive layer (outer diameter also including the adhesive layer) to prevent rattling due to the supply path and the base material, and as a result, it is considered that the core misalignment is prevented and an occurrence of unevenness in film thickness (uneven thickness) of the elastic layer is prevented.

As a manufacturing method of the charging roller according to the exemplary embodiment, it is desirable to use a manufacturing method including: forming a conductive adhesive layer having a gel fraction equal to or greater than 50% on an outer circumferential surface of a conductive base material; and supplying the base material formed with the adhesive layer to a cross head while inserting the base material into a supply path having a smaller inner diameter than an outer diameter of the base material having the adhesive layer formed thereon, by using an extrusion molding machine, and applying a material for elastic layer formation onto the adhesive layer to form a conductive elastic layer.

Gel Fraction of Adhesive Layer

The gel fraction of the adhesive layer is equal to or greater than 50%, preferably equal to or greater than 60%, and more preferably equal to or greater than 90%. When the gel fraction of the adhesive layer is set to be equal to or greater than 50%, mechanical properties of the adhesive layer are improved, and accordingly, when supplying the base material including the adhesive layer from the supply path in the extrusion molding machine, the base material passes through the supply path having a smaller diameter than the outer diameter of the base material including the adhesive layer (outer diameter including the adhesive layer). As a result, occurrence of unevenness in film thickness (uneven thickness) of the elastic layer is prevented.

The gel fraction of the adhesive layer may be controlled by changing an amount of crosslinking with selection of a material of the adhesive used for the adhesive layer, or adjustment of a heating temperature or heating time at the time of forming the adhesive layer.

The measurement of the gel fraction of the adhesive layer is performed based on JIS-K6796 (1998). 1 part by weight of the adhesive layer of the charging roller is cut out to measure the weight. This is set as the weight of the resin before solvent extraction. After dissolving and immersing the cut-out adhesive layer in a solvent, toluene (10 parts by weight) for 24 hours, filtration is performed and a residual resin coated material is removed, and the weight thereof is measured. This weight is set as the weight after extraction. Accordingly, the gel fraction is calculated with the following equation.

Gel fraction (%)=((weight after extraction)/(weight of resin before solvent extraction))×100

When the gel fraction is equal to or greater than 50%, a coated film with an excellent crosslinking structure is provided, and excellent cracking resistance is obtained.

Coefficient of Friction of Adhesive Layer (Coefficient of Static Friction)

In the exemplary embodiment, it is preferable that a coefficient of friction of the adhesive layer be from 0.2 to 0.9.

When the coefficient of friction thereof is equal to or greater than the lower limit value described above, scratch resistance when forming the elastic layer on the surface of the adhesive layer is improved, and as a result, a charging roller having excellent dimensional accuracy is provided. Meanwhile, when the coefficient of friction thereof is equal to or smaller than the upper limit value described above, the generation of irregularities on the surface after the formation is prevented, and as a result, a charging roller having excellent dimensional accuracy is provided.

The coefficient of friction of the adhesive layer described above is more preferably from 0.3 to 0.8 and even more preferably from 0.4 to 0.7.

In the charging roller, a layer (elastic layer or the like) on the outer circumferential side with respect to the adhesive layer is forcibly peeled off to expose the outer circumferential surface of the adhesive layer, and then the coefficient of friction of the adhesive layer (coefficient of static friction) is measured by a method based on ASTM-D-1894.

The adjustment of the coefficient of friction of the adhesive layer is achieved by selection of a material of the adhesive used for the adhesive layer and a solvent for diluting the adhesive, control of coating conditions and drying conditions of the adhesive or the like.

Charging Roller

First, a configuration of the charging roller will be described with reference to the drawings.

Figure 2:
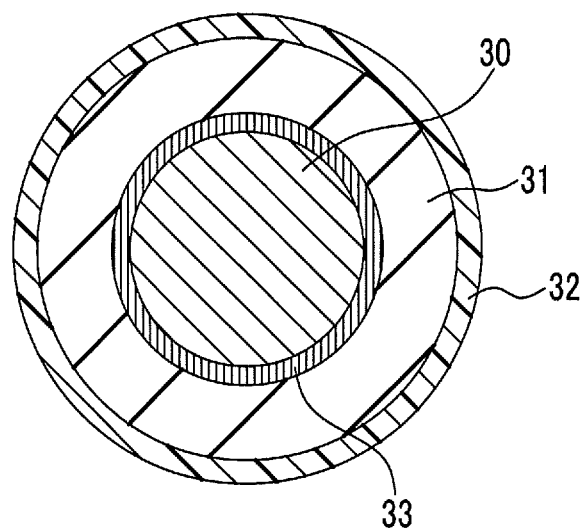
FIG. 2 is a schematic cross-sectional view of a charging roller according to the exemplary embodiment.

FIG. 1 is a schematic perspective view showing an example of the charging roller according to the exemplary embodiment. FIG. 2 is a schematic cross-sectional view of the charging roller shown in FIG. 1 and is a cross-sectional view taken along line II-II of FIG. 1.

As shown in FIGS. 1 and 2, a charging roller 121 according to the exemplary embodiment is, for example, a roller member including a cylindrical or a columnar base material 30 (shaft), an adhesive layer 33 disposed on an outer circumferential surface of the base material 30, and a conductive elastic layer 31 disposed on an outer circumferential surface of the adhesive layer 33. The charging roller may include a conductive outermost layer 32 disposed on an outer circumferential surface of the conductive elastic layer 31.

The configuration of the charging roller 121 according to the exemplary embodiment is not limited to the configuration described above, and, for example, a resistance adjusting layer or a migration preventing layer disposed between the conductive elastic layer 31 and the conductive outermost layer 32, and a coated layer (protection layer) disposed on the outside (outermost surface) of the conductive outermost layer 32 may be provided.

Conductivity in the specification means that volume resistivity at 20° C. is smaller than $1 \times 10^{13}$ Ωcm.

Hereinafter, steps of the manufacturing method of the charging roller will be described.

Adhesive Layer Forming Step

Base Material

The base material 30 will be described.

The base material 30 is configured with a metal or alloy such as aluminum, copper alloy, and stainless steel; iron plated with chromium, nickel, or the like; and a conductive material such as a conductive resin.

The base material 30 functions as an electrode and a support member of the charging roller, and examples of the material thereof include metal such as iron (such as free-cutting steel), copper, brass, stainless steel, aluminum, and nickel. In the exemplary embodiment, the base material 30 is a conductive rod member, and members (such as resin or ceramic members) having the outer circumferential surface plated, members (such as resin or ceramic members) in which a conducting agent is dispersed or the like may be used as the base material 30. The base material 30 may be a hollow member (tubular member) or may be a non-hollow member.

Adhesive Layer

The adhesive layer is a layer which adheres the conductive elastic layer 31 and the base material 30 to each other, and a gel fraction thereof is equal to or greater than 50%.

The adhesive layer may be formed by coating the base material with rubber or a resin dissolved in a solvent. In addition, a heating process may be performed after the coating with the adhesive.

Kinds of the adhesive are not particularly limited, but a resin having a crosslinking structure is preferable in order to control the gel fraction thereof in the range described above, and a chlorinated polypropylene resin and an epoxy resin are used in combination, for example. Examples thereof include polyurethane, acrylic resins such as polymethyl methacrylate and polybutyl methacrylate, polyvinyl butyral, polyvinyl acetal, polyarylate, polycarbonate, polyester, phenoxy resins, polyvinyl acetate, polyamide, polyvinyl pyridine, and cellulose resins.

Examples of the rubber material include rubber such as EPDM, polybutadiene, natural rubber, polyisoprene, styrene-butadiene rubber (SBR), chloroprene rubber (CR), nitryl-butadiene rubber (NBR), silicone rubber, urethane rubber, and epichlorohydrin rubber, and resin materials such as butadiene resins (RB), polystyrene resins such as styrene-butadiene-styrene elastomer (SBS), polyolefin resins, polyester resins, polyurethane, polyethylene (PE), polypropyrene (PP), polyvinyl chloride (PVC), acrylic resins, a styrene-vinyl acetate copolymer, and a butadiene-acrylonitrile copolymer, and a curing agent according to a functional group.

Among these, it is preferable to use a chlorinated polypropylene resin and an epoxy resin in combination.

As the chlorinated polypropylene resin, maleic acid-modified chlorinated polypropylene is preferable, for example.

In addition, halogenated olefins such as polychloroprene, chlorinated polybutadiene, a chlorinated ethylene-propylene copolymer, a chlorinated butadiene-styrene copolymer, and chlorinated polyvinyl chloride, and polyolefin adhesives that are obtained by graft-modifying the above materials with an unsaturated carboxylic acid such as an acrylic acid, a methacrylic acid, a maleic acid, or an itaconic acid, or an acid anhydride such as maleic anhydride or itaconic acid anhydride are used in combination with the chlorinated polypropylene resin or instead of the chlorinated polypropylene resin. In addition, various commercially available olefin adhesives such as an ethylene-vinyl acetate copolymer, an ethylene-ethyl acrylate copolymer, an ethylene-methacrylic acid (EMAA) copolymer, and modified products of the above resins may also be used, and these may be used alone or as a mixture of two or more kinds thereof.

Examples of the form thereof include a solution form, a latex form, a hot melt form, and a film form. A solution form or a hot melt form is preferable from the viewpoint of simplification and facilitation of processing.

Among these, maleic acid-modified chlorinated polypropylene is more preferable.

Maleic acid-modified chlorinated polypropylene is polypropylene which is modified with maleic acid and chlorinated. In the exemplary embodiment, maleic acid-modified chlorinated polypropylene includes chlorinated polypropylene modified with maleic anhydride.

As polypropylene to be a base of maleic acid-modified chlorinated polypropylene, a homopolymer of propylene or a copolymer of propylene and one kind or two or more kinds selected from the other olefins (for example, ethylene, pentene, hexene, octene, and decene) is used, for example. A content rate of propylene in the copolymer is preferably equal to or greater than 40% by weight and more preferably equal to or greater than 60% by weight, from the viewpoint of adhesiveness with an olefin elastomer.

A preparation method of maleic acid-modified chlorinated polypropylene is not particularly limited. For example, a method of graft-modifying maleic acid (also including maleic anhydride, same applies hereinafter) with polypropylene to be a base and chlorinating the resultant material, a method of performing graft-modifying and chlorinating in the reverse order, and a method of performing graft-modifying and chlorinating in parallel, are used.

A method of modification with maleic acid is not particularly limited, and the modification is performed by causing maleic acid to react in a mixed solution of polypropylene and an organic solvent in the presence of a radical generator.

A method of chlorinating of maleic acid-modified polypropylene is not particularly limited, and chlorinating is performed by introducing chlorine gas into a mixed solution of the maleic acid-modified polypropylene and an organic solvent, for example.

A chlorine content rate in the maleic acid-modified chlorinated polypropylene is preferably from 5% by weight to 30% by weight and more preferably from 10% by weight to 25% by weight. When the chlorine content rate is in the range described above, an adhesive composition is easily dissolved with respect to the organic solvent, and excellent storage stability of the adhesive composition, an excellent coating property thereof, and excellent adhesiveness thereof with an olefin elastomer are obtained.

A weight-average molecular weight of the maleic acid-modified chlorinated polypropylene is preferably from 50,000 to 300,000 and more preferably from 100,000 to 150,000, from the viewpoint of adhesiveness and solubility to the organic solvent.

The maleic acid-modified chlorinated polypropylene has excellent adhesiveness with respect to the olefin elastomer.

The epoxy resin used for the adhesive layer of the exemplary embodiment is not particularly limited, as long as it is a compound including two or more epoxy groups.

The epoxy resin means a general monomer, oligomer, and polymer including two or more epoxy groups in one molecule, and a molecular weight and a molecular structure thereof are not particularly limited. Examples thereof include biphenyl type epoxy resins, bisphenol type epoxy resins, stilbene type epoxy resins, phenol novolak type epoxy resin, cresol novolak type epoxy resins, triphenolmethane type epoxy resins, alkyl-modified triphenolmethane type epoxy resins, triazine nucleus-containing epoxy resins, dicyclopentadiene-modified phenol type epoxy resins, and phenol aralkyl type epoxy resins (including a phenylene skeleton or a diphenylene skeleton or the like), and these may be used alone or in combination of two or more kinds thereof.

Among these, biphenyl type epoxy resins, bisphenol type epoxy resins, stilbene type epoxy resins, phenol novolak type epoxy resin, cresol novolak type epoxy resins, and triphenolmethane type epoxy resins are preferable, biphenyl type epoxy resins, bisphenol type epoxy resins, phenol novolak type epoxy resin, and cresol novolak type epoxy resins are more preferable, and bisphenol type epoxy resins are even more preferable.

As the epoxy resin, at least one kind selected from a bisphenol A type epoxy resin and a bisphenol F type epoxy resin, a urethane-modified epoxy resin, and a rubber-modified epoxy resin may be used in combination.

Curing Accelerator

In addition, a curing accelerator may be used in the adhesive layer according to the exemplary embodiment. Examples of the curing accelerator include phosphate, tertiary amine, tertiary amine salts, imidazole, and sulfonium salt. Among these, phosphate is more preferable.

Phosphate is not particularly limited. Examples thereof include aluminum phosphate, aluminum metaphosphate, aluminum dihydrogen tripolyphosphate, titanium hydrogen orthophosphate, pyrophosphate titanium, zirconium hydrogen orthophosphate, hydrogen orthophosphate cerium, zinc phosphate, and a modified element by wet blending of the above components with zinc oxide or magnesium oxide. In addition, an element obtained by performing surface treatment of phosphate with at least one of Si and Zn may be used. Phosphate subjected to dehydration treatment is one of the preferable forms of phosphate. In addition, phosphate is preferably subjected to fine grinding, from a viewpoint of re-dispersibility.

Among these, aluminum dihydrogen tripolyphosphate is preferable, from the viewpoint of excellent adhesiveness, excellent dispersibility in the adhesive composition, and availability.

Aluminum dihydrogen tripolyphosphate is a compound represented by $AlH_2P_3O_{10}$. Aluminum dihydrogen tripolyphosphate is not particularly limited, and examples thereof include $AlH_2P_3O_{10}$, and $AlH_2P_3O_{10}.2H_2O$.

Aluminum dihydrogen tripolyphosphate subjected to fine grinding is used as one of the preferable forms of phosphate. Aluminum dihydrogen tripolyphosphate subjected to fine grinding is commercially available, and K-WHITE#105 manufactured by Tayca Corporation is used as the commercially available product thereof, for example.

When using maleic acid-modified chlorinated polypropylene, the content of the curing accelerator is preferably from 1 part by weight to 70 parts by weight and more preferably from 10 parts by weight to 40 parts by weight, with respect to 100 parts by weight of maleic acid-modified chlorinated polypropylene. When the content thereof is in the range described above, excellent reactivity with maleic acid-modified chlorinated polypropylene, excellent dispersibility in the adhesive composition, and excellent water resistance are obtained.

Epoxy Resin Curing Agent

The adhesive may contain a well-known component as a curing agent. For example, a component used as a curing agent of an epoxy resin is used.

Examples of an epoxy resin curing agent may include all agents well known by a person skilled in the art. Examples thereof include linear aliphatic diamine having 2 to 20 carbon atoms such as ethylene diamine, trimethylene diamine, tetramethylene diamine, and hexamethylene diamine, amines such as metaphenylenediamine, paraphenylenediamine, paraxylenediamine, 4,4'-diaminodiphenyl methane, 4,4'-diaminodiphenyl propane, 4,4'-diaminodiphenyl ether, 4,4'-diaminodiphenyl sulfone, 4,4'-diaminodicyclohexane, bis(4-aminophenyl)phenyl methane, 1,5-diaminonaphthalene, metaxylenediamine, 1,1-bis(4-aminophenyl)cyclohexane, and dicyanodiamide, a resol type phenol resin such as an aniline-modified resol resin and a dimethyl ether resol resin, a novolac type phenol resin such as a phenol novolak resin, a cresol novolak resin, a tert-butylphenol novolak resin, and a nonylphenol novolak resin, polyoxy styrene such as poly-p-oxystyrene, a phenol resin such as a phenol aralkyl resin, and anhydride, but are not particularly limited thereto.

Among these, two or more kinds thereof may be used in combination.

The content of the curing agent is not particularly limited, and the optimal content is different depending on the kind of the curing agent. For example, the well-known optimal content for each curing agent is preferably used. This optimal content is disclosed in Volume 3 of "Review: Epoxy Resins Basic" (published by The Japan Society Of Epoxy Resin Technology, 2003).

Other Components

The adhesive layer may further contain a catalyst, an inorganic filler, an organic or polymeric filler, a flame retardant, an antistatic agent, a conductivity imparting agent, a lubricant, a slidability imparting agent, a surfactant, a colorant, or the like, in addition to the components described above. Among these, two or more kinds may be contained.

Conductive powder for imparting conductivity such as carbon black such as Ketjen black and acetylene black; thermal decomposition carbon and graphite; various conductive metals such as aluminum, copper, nickel, and stainless steel or alloys thereof; various conductive metal oxides such as tin oxide, indium oxide, titanium oxide, tin oxide-antimony oxide solid solution, and tin oxide-indium oxide solid solution; and insulating materials of which the surface is processed to have conductivity, may be added to the adhesive for forming the adhesive layer.

The content of the conductive powder to be added to the adhesive layer is preferably from 0 parts by weight to 5 parts by weight with respect to 100 parts by weight of the adhesive layer.

Preparation of Adhesive

A preparation method of the adhesive is not particularly limited, and the adhesive may be prepared by a well-known method, for example. When using the chlorinated polypropylene resin and the epoxy resin in combination, the adhesive is obtained by kneading the components described above such as chlorinated polypropylene resin, the epoxy resin, the curing agent, and the curing accelerator, for example.

Formation of Adhesive Layer

The adhesive layer may be formed by coating the base material with rubber or a resin dissolved in a solvent.

Examples of the solvent include normal organic solutions such as methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These may be used alone or in mixture of two or more kinds thereof.

The thickness of the adhesive layer is not particularly limited, but is preferably from 1 μm to 100 μm, and more preferably from 5 μm to 50 μm.

Conductive Elastic Layer Formation Step

Conductive Elastic Layer

The conductive elastic layer 31 will be described.

The conductive elastic layer 31 includes, for example, an elastic material, a conducting agent, and other additives if necessary. The conductive elastic layer 31 is a layer formed on the outer circumferential surface of the base material 30 with an adhesive layer interposed therebetween.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and blends thereof. Among these, polyurethane, silicone rubber, EPDM, epichlorohydrin-ethylene oxide copolymer rubber, epichlorohydrin-ethylene oxide-allyl glycidyl ether copolymer rubber, NBR, and blends thereof are preferably used. The elastic materials may be foamed or unfoamed.

Examples of the conducting agent include an electron conducting agent and an ion conducting agent. Examples of the electron conducting agent include powder of carbon black such as Ketjen black and acetylene black; thermal decomposition carbon and graphite; various conductive metals such as aluminum, copper, nickel, and stainless steel or alloys thereof; various conductive metal oxides such as tin oxide, indium oxide, titanium oxide, tin oxide-antimony oxide solid solution, and tin oxide-indium oxide solid solution; and insulating materials of which the surface is processed to have conductivity. Examples of the ion conducting agent include perchlorates and chlorates of tetraethyl ammonium and lauryl trimethyl ammonium; alkali metals such as lithium and magnesium, and perchlorates and chlorates of alkaline earth metals.

The conducting agents may be used alone or in combination of two or more kinds thereof.

Herein, specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V", all of which are manufactured by Evonik Degussa Corporation, and "MONARCH 1000", "MONARCH 1300", "MONARCH 1400", "MOGUL-L", and "REGAL 400R", all of which are manufactured by Cabot Corporation.

The average particle size of the conducting agents is preferably from 1 nm to 200 nm.

The average particle size is calculated by observing a sample, obtained by cutting the conductive elastic layer 31, with an electron microscope, measuring the diameters (the maximum diameters) of 100 conducting agent particles, and averaging the measured diameters. The average particle size may be measured by using Zetasizer Nano ZS manufactured by Sysmex Corporation.

The content of the conducting agent to be added is not particularly limited. However, in a case of the electron conducting agent, the content thereof is preferably in a range of 1 part by weight to 30 parts by weight, and more preferably in a range of 15 parts by weight to 25 parts by weight, with respect to 100 parts by weight of the elastic material. Meanwhile, in a case of the ion conducting agent, the content thereof is preferably in a range of 0.1 part by weight to 5.0 parts by weight, and more preferably in a range of 0.5 part by weight to 3.0 parts by weight with respect to 100 parts by weight of the elastic material.

Examples of other additives mixed into the conductive elastic layer 31 include materials that may be typically added to an elastic layer, such as a softener, a plasticizer, a curing agent, a vulcanizing agent, a vulcanization accelerator, an antioxidant, a surfactant, a coupling agent, and a filler (such as silica and calcium carbonate).

Formation of Conductive Elastic Layer

The conductive elastic layer 31 is, for example, formed on the outer circumferential surface of the adhesive layer by extruding the material for the conductive elastic layer formation along with the base material 30 having the adhesive layer formed thereon by the use of an extrusion molding machine including a cross head and the like.

Herein, the method of forming the conductive elastic layer using the extrusion molding machine including the cross head will be described with reference to the drawings.

Figure 3:
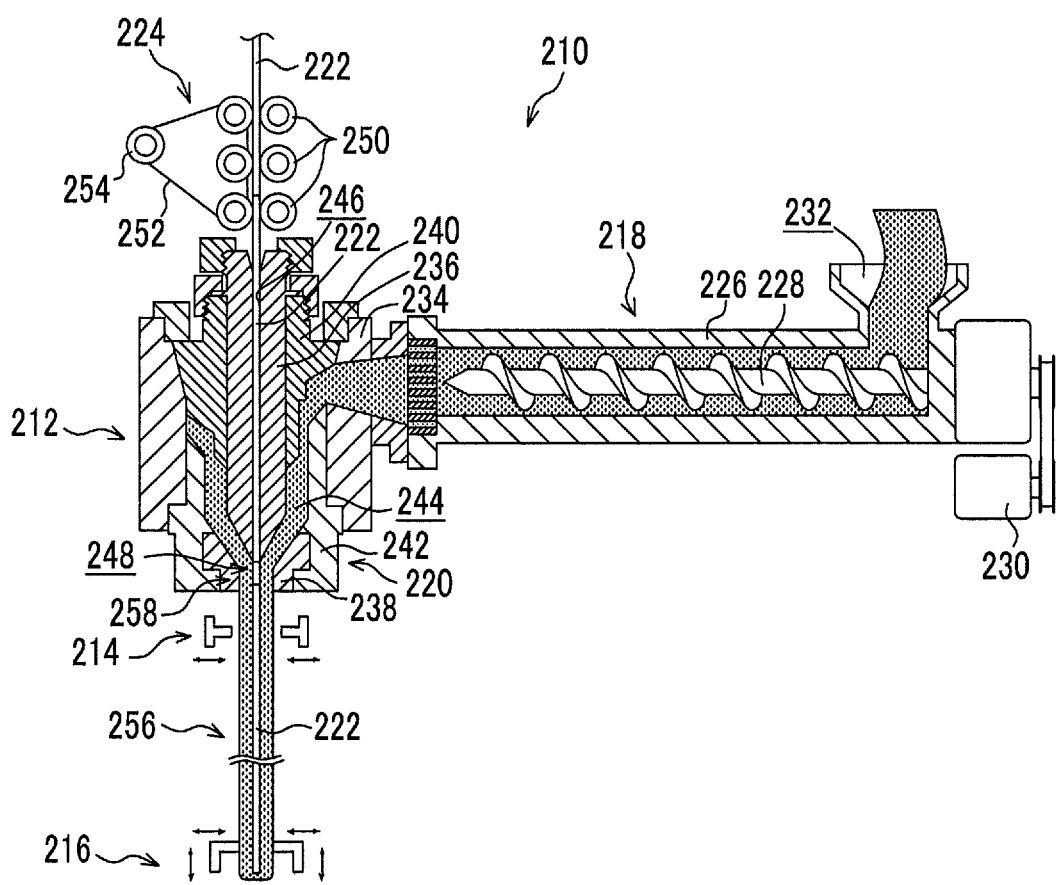
FIG. 3 is a schematic view showing an extrusion molding machine including a cross head.

FIG. 3 shows a configuration of a rubber roller manufacturing apparatus (the extrusion molding machine including the cross head) 210 used for forming an elastic layer in the exemplary embodiment.

The rubber roller manufacturing apparatus 210 according to the exemplary embodiment includes a discharger 212 configured with a so-called cross head die, a pressurizer 214 disposed below the discharger 212, and a puller 216 disposed below the pressurizer 214.

The discharger 212 includes a rubber material supply unit 218 which supplies an unvulcanized rubber material (the material for the conductive elastic layer 31 formation), an extrusion unit 220 which extrudes the rubber material supplied from the rubber material supply unit 218 in a cylindrical shape, and a core supply unit 224 which supplies a core 222 (the base material 30 having the adhesive layer formed thereon) to the central part of the rubber material extruded in a cylindrical shape from the extrusion unit 220.

The rubber material supply unit 218 includes a screw 228 in a cylindrical body 226. The screw 228 is rotationally driven by a drive motor 230. An input port 232 to which the rubber material is input is provided on the body 226 on the side of the drive motor 230. The rubber material input from the input port 232 is fed to the extrusion unit 220 while being kneaded by the screw 228 in the body 226. By adjusting the rotation speed of the screw 228, the speed at which the rubber material is fed may be adjusted.

The extrusion unit 220 includes a cylindrical case 234 which is connected to the rubber material supply unit 218, a columnar mandrel 236 which is disposed at the center in the case 234, and a discharge head 238 which is disposed below the mandrel 236. The mandrel 236 is held in the case 234 by a holding member 240. The discharge head 238 is held in the case 234 by a holding member 242. An annular flow path 244 in which the rubber material flows in a ring shape is formed between the outer circumferential surface (the outer circumferential surface of the holding member 240 in a part) of the mandrel 236 and the inner circumferential surface (the inner circumferential surface of the discharge head 238 in a part) of the holding member 242.

An insertion hole 246 through which the core 222 is inserted is formed at the center of the mandrel 236. The lower part of the mandrel 236 is tapered to the end thereof. The region below the tip of the mandrel 236 is a mergence region 248 in which the core 222 supplied from the insertion hole 246 and the rubber material supplied from the annular flow path 244 merge into each other. That is, the rubber material is extruded in a cylindrical shape toward the mergence region 248 and the core 222 is sent to the central part of the rubber material extruded in a cylindrical shape.

The core supply unit 224 includes roller pairs 250 disposed above the mandrel 236. Plural (three) roller pairs 250 are provided, and one roller of each roller pair 250 is connected to a driving roller 254 through a belt 252. When the driving roller 254 is driven, the core 222 nipped by the roller pairs 250 is fed to the insertion hole 246 of the mandrel 236. The core 222 has a predetermined length, and plural cores 222 sequentially pass through the insertion hole 246 by causing a following core 222 fed by the roller pairs 250 to extrude a preceding core 222 present in the insertion hole 246 of the mandrel 236. The driving of the driving roller 254 is temporarily stopped when the front end of the preceding core 222 is located at the tip of the mandrel 236, and the cores 222 are fed with a gap in the mergence region 248 below the mandrel 236.

In this way, in the discharger 212, the rubber material is extruded in a cylindrical shape in the mergence region 248 and the cores 222 are sequentially fed with a gap to the central part of the rubber material. Accordingly, the outer circumferential surface of the core 222 is coated with the rubber material, and a rubber roller portion 256 (that is, the conductive elastic layer) is formed on the outer circumferential surface of the core 222 (the base material 30 having the adhesive layer formed thereon).

The thickness of the conductive elastic layer 31 is preferably from 1 mm to 10 mm and more preferably, from 2 mm to 5 mm.

The volume resistivity of the conductive elastic layer 31 is preferably from $10^3$ Ωcm to $10^{14}$ Ωcm.

Conductive Outermost Layer

A polymeric material configuring the conductive outermost layer 32 is not particularly limited. Examples thereof include polyamide, polyurethane, polyvinylidene fluoride, a tetrafluoroethylene copolymer, polyester, polyimide, a silicone resin, an acrylic resin, polyvinyl butyral, an ethylene tetrafluoroethylene copolymer, a melamine resin, fluororubber, an epoxy resin, polycarbonate, polyvinyl alcohol, cellulose, polyvinylidene chloride, polyvinyl chloride, polyethylene, and an ethylene-vinyl acetate copolymer.

The polymeric materials may be used alone or in a mixture or co-polymerization of two or more kinds thereof. The number-average molecular weight of the polymeric materials is preferably in a range of 1,000 to 100,000 and more preferably in a range of 10,000 to 50,000.

The conductive outermost layer 32 may be formed of a composition obtained by mixing the conducting agents used in the conductive elastic layer 31 or various particles described below as a conducting agent with the polymeric materials. The amount thereof to be added is not particularly limited, but is preferably in a range of 1 part by weight to 50 parts by weight, and more preferably in a range of 5 parts by weight to 20 parts by weight, with respect to 100 parts by weight of the polymeric material.

As the particles, metal oxides and complex metal oxides such as silicon oxide, aluminum oxide, and barium titanate and polymer powders such as tetrafluoroethylene and vinylidene fluoride may be used alone or in combination, but the particles are not limited to these examples.

The thickness of the conductive outermost layer 32 is preferably thick in consideration of durability against abrasion of the charging member, but the thickness thereof is preferably in a range of 0.01 µm to 1,000 µm, more preferably in a range of 0.1 µM to 500 µm, and even more preferably in a range of 0.5 µm to 100 µm.

The conductive outermost layer 32 may be formed on the conductive elastic layer using a dipping method, a spray method, a vacuum deposition method, a plasma coating method, or the like. Among these methods, the dipping method may be preferably used from the viewpoint of manufacturing processes.

Charging Device

A charging device according to the exemplary embodiment will be described below.

Figure 4:
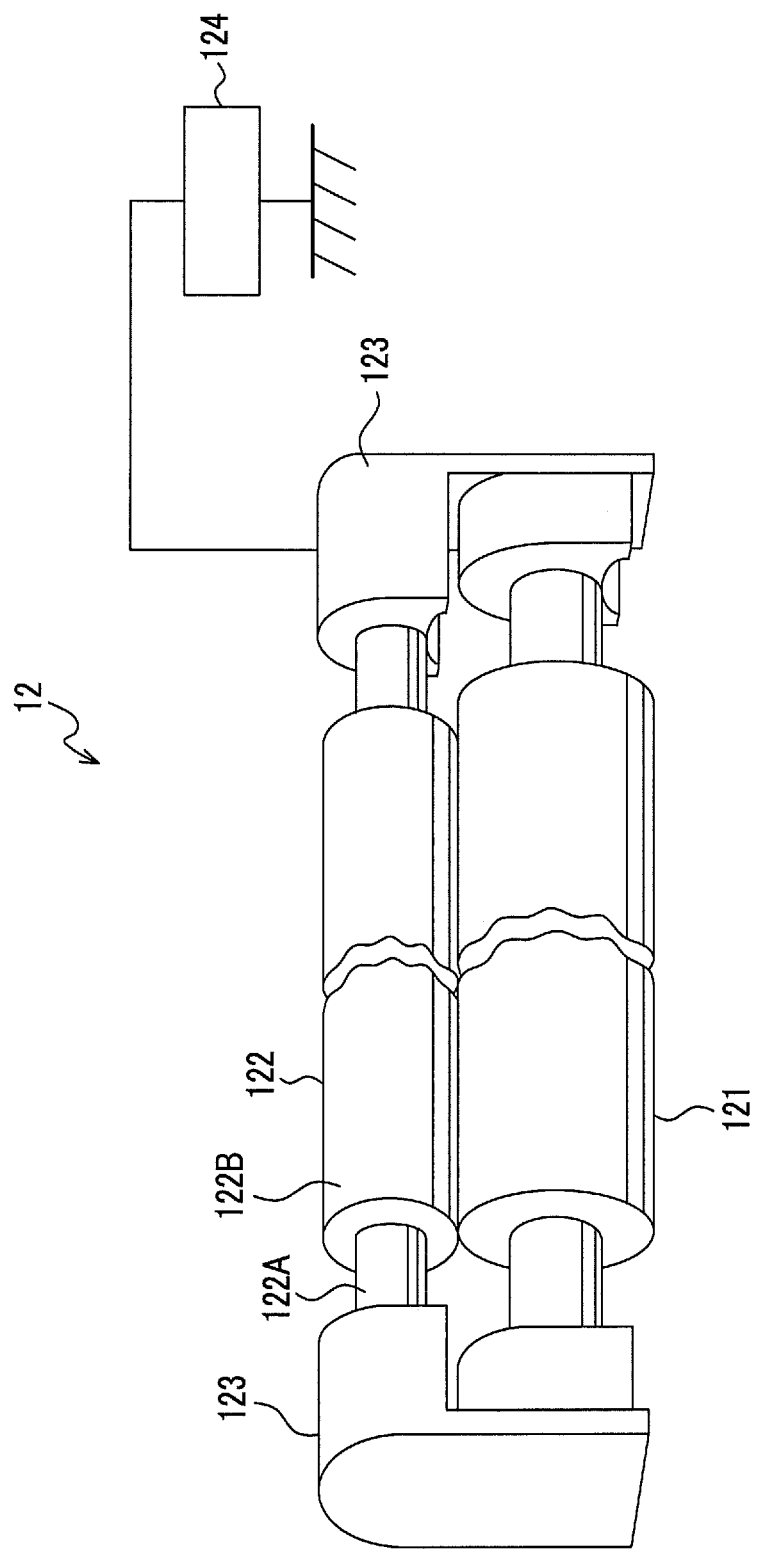
FIG. 4 is a schematic perspective view of a charging device according to the exemplary embodiment.

FIG. 4 is a schematic perspective view of a charging device according to the exemplary embodiment.

In the charging device according to the exemplary embodiment, the charging roller according to the exemplary embodiment is used as a charging roller.

Specifically, in a charging device 12 according to the exemplary embodiment, for example, the charging roller 121 and a cleaning member 122 are in contact with each other with a specific amount of inroad, as shown in FIG. 4. Both ends in the axis direction of the base material 30 of the charging roller 121 and a base material 122A of the cleaning member 122 are held by conductive bearings 123 (conductive bearing) so that the members are rotatable. A power source 124 is connected to one of the conductive bearings 123.

The charging device according to the exemplary embodiment is not limited to the above-described configuration, and, for example, the cleaning member 122 may not be provided.

The cleaning member 122 is a cleaning member for cleaning the surface of the charging roller 121 and is formed, for example, in a roller shape. The cleaning member 122 is, for example, configured with the base material 122A having a cylindrical or columnar shape and an elastic layer 122B on the outer circumferential surface of the base material 122A.

The base material 122A is a rod-like conductive member. Examples of the material thereof include metals such as iron (such as free-cutting steel), copper, brass, stainless steel, aluminum, and nickel. Members (such as resin or ceramic members) having the outer circumferential surface plated or members (such as resin or ceramic members) in which a conducting agent is dispersed may be used as the base material 122A, for example. The base material 122A may be a hollow member (tubular member) or a non-hollow member.

The elastic layer 122B is formed of a foam body having a three-dimensional porous structure, has voids or unevenness (hereinafter, referred to as cells) in or on the surface thereof, and preferably has elasticity. The elastic layer 122B includes foamed resin materials or rubber materials such as polyurethane, polyethylene, polyamide, olefin, melamine or polypropylene, acrylonitrile-butadiene copolymer rubber (NBR), ethylene-propylene-diene copolymer rubber (EPDM), natural rubber, styrene-butadiene rubber, chloroprene, silicone, and nitrile.

Among the foamed resin materials and rubber materials, polyurethane resistant to tearing and tensile strength may be particularly suitably used so as to efficiently clean foreign materials such as particles of the toner or the external additives by the frictional slide over the charging roller 121 at the same time, to make it difficult for the surface of the charging roller 121 to be damaged due to the friction with the cleaning member 122, and to make it difficult to disconnect or break the elastic layer for a long time.

The polyurethane is not particularly limited, and examples thereof may include reactants such as polyols (such as polyester polyol, polyether polyol, and acrylpolyol) and isocyanates (such as 2,4-tolylene diisocyanate, 2,6-trilene diisocyanate, 4,4-diphenylmethane diisocyanate, tolidine diisocyanate, and 1,6-hexamethylene diisocyanate) and may also include reactants based on chain extenders (such as 1,4-butanediol and trimethylolpropane). The polyurethane is typically foamed using a foaming agent (such as water or azo compounds (such as azodicarbonamide and azobisisobutyronitrile).

The number of cells in the elastic layer 122B is preferably from 20/25 mm to 80/25 mm, more preferably from 30/25 mm to 80/25 mm, and particularly preferably from 30/25 mm to 50/25 mm.

The hardness of the elastic layer 122B is preferably from 100 N to 500 N, more preferably from 100 N to 400 N, and particularly preferably from 150 N to 400 N.

The conductive bearings 123 are members which hold the charging roller 121 and the cleaning member 122 so as to be rotatable together and maintain the inter-shaft distance between the members. The conductive bearings 123 may have any material and shape, as long as they are formed of a conductive material. Examples thereof include a conductive bearing or a conductive sliding bearing.

The power source 124 is a device that applies a voltage to the conductive bearings 123 to charge the charging roller 121 and the cleaning member 122 to the same polarity and a known high-voltage power source is used.

In the charging device 12 according to the exemplary embodiment, the charging roller 121 and the cleaning member 122 are charged to the same polarity, for example, by applying a voltage to the conductive bearings 123 from the power source 124.

Image Forming Apparatus and Process Cartridge

An image forming apparatus according to the exemplary embodiment includes an image holding member, a charging unit that charges the image holding member, a latent image forming unit that forms a latent image on the charged surface of the image holding member, a developing unit that develops the latent image formed on the surface of the image holding member with a toner to form a toner image, and a transfer unit that transfers the toner image formed on the surface of the image holding member to a recording medium. The above-described charging device according to the exemplary embodiment is used as the charging unit (charging device).

Meanwhile, a process cartridge according to the exemplary embodiment is detachable from, for example, the image forming apparatus having the above-described configuration and includes an image holding member and a charging unit that charges the image holding member. The above-described charging device according to the exemplary embodiment is used as the charging unit. The process cartridge according to the exemplary embodiment may include at least one selected from the group consisting of a developing unit that develops a latent image formed on the surface of the image holding member with a toner to form a toner image, a transfer unit that transfers the toner image formed on the surface of the image holding member to a recording medium, and a cleaning unit that removes the toner remaining on the surface of the image holding member after the transfer, if necessary.

Figure 5:
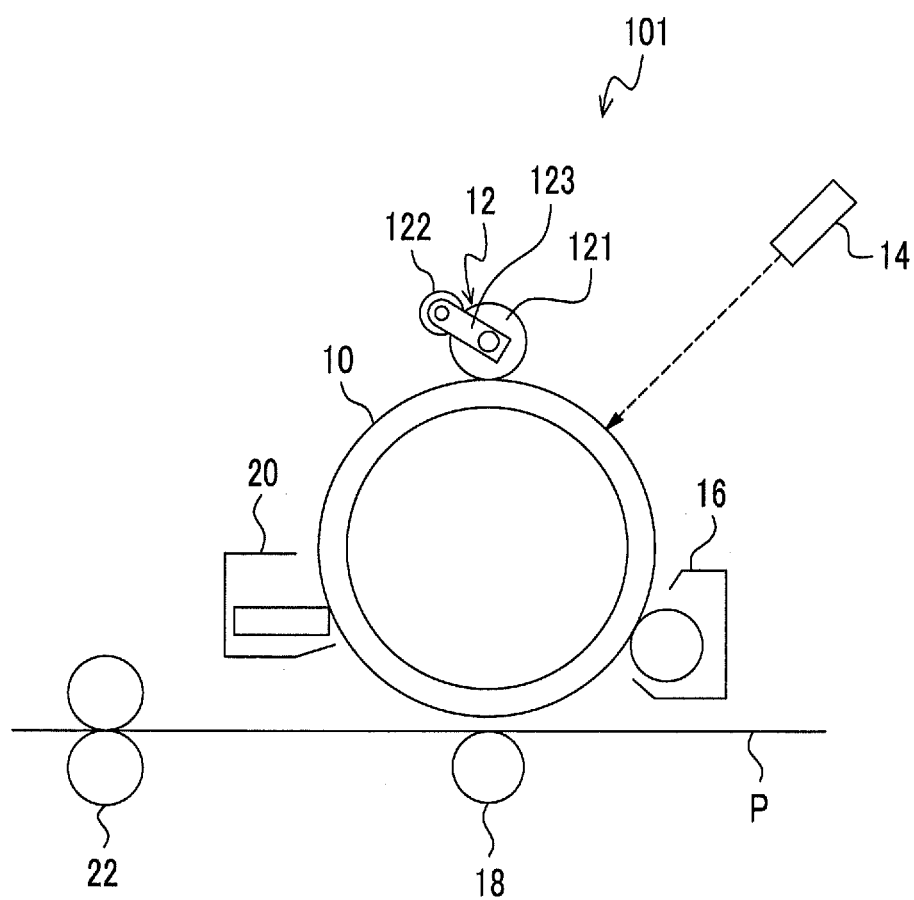
FIG. 5 is a schematic configuration diagram showing an image forming apparatus according to the exemplary embodiment.
Figure 6:
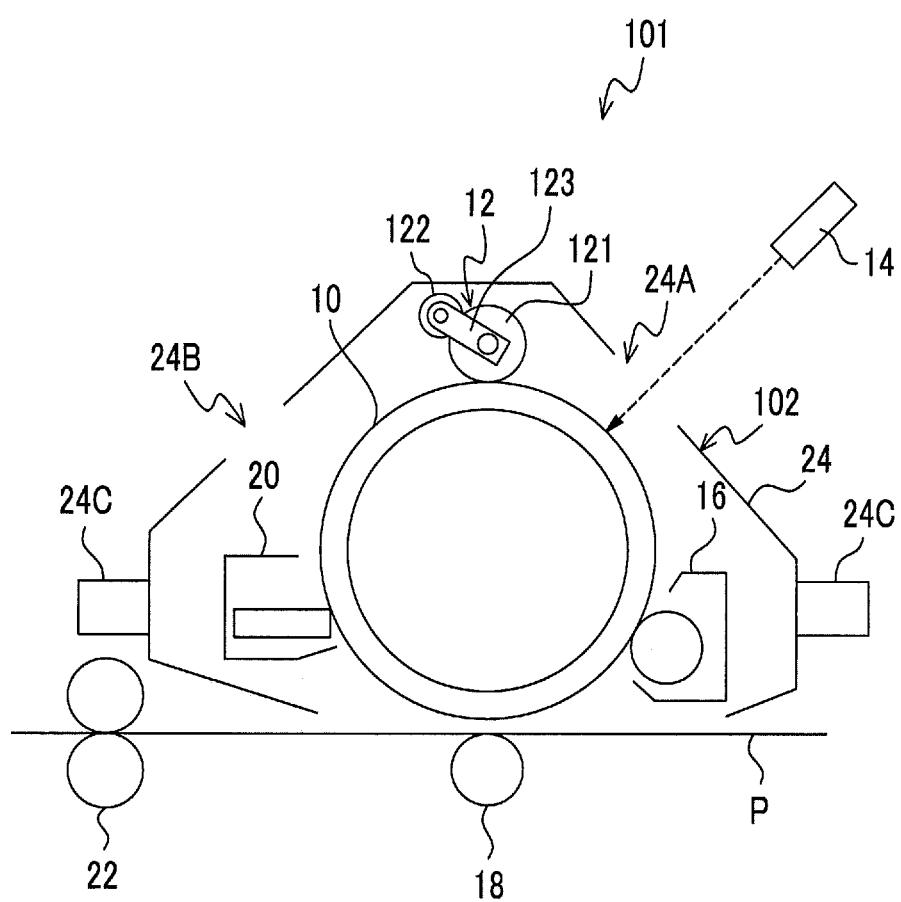
FIG. 6 is a schematic configuration diagram showing a process cartridge according to the exemplary embodiment.

Next, the image forming apparatus and the process cartridge according to the exemplary embodiment will be described with reference to the drawings. FIG. 5 is a schematic configuration diagram showing the image forming apparatus according to the exemplary embodiment. FIG. 6 is a schematic configuration diagram showing the process cartridge according to the exemplary embodiment.

As shown in FIG. 5, an image forming apparatus 101 according to the exemplary embodiment includes an image holding member 10 and further includes the charging device 12 that charges the image holding member, an exposing device 14 that exposes the image holding member 10 charged by the charging device 12 to form a latent image, a developing device 16 that develops the latent image formed by the exposing device 14 with a toner to form a toner image, a transfer device 18 that transfers the toner image formed by the developing device 16 to a recording medium P, and a cleaning device 20 that removes the toner remaining on the surface of the image holding member 10 after the transfer, around the image holding member 10. The image forming apparatus further includes a fixing device 22 that fixes the toner image transferred to the recording medium P by the transfer device 18.

In the image forming apparatus 101 according to the exemplary embodiment, the charging device according to the exemplary embodiment provided with the charging roller 121, the cleaning member 122 that is disposed in contact with the charging roller 121, the conductive bearings 123 (conductive bearings) that hold both ends in the axis direction of the charging roller 121 and the cleaning member 122 so as to be independently rotatable, and the power source 124 that is connected to one of the conductive bearings 123 is used as the charging device 12.

Meanwhile, the image forming apparatus 101 according to the exemplary embodiment employs the known configuration of an electrophotographic image forming apparatus according to the related art as the configuration other than the charging device 12 (the charging roller 121). An example of each configuration will be described.

The image holding member 10 employs a known photoreceptor without any particular limitation, and a so-called function-divided organic photoreceptor in which a charge generating layer and a charge transporting layer are divided may be suitably used. The image holding member 10 of which the surface layer is coated with a protective layer having a charge transporting function and a cross-linking structure may be suitably used. Photoreceptors formed of a siloxane-based resin, a phenol-based resin, a melamine resin, a guanamine resin, and an acrylic resin as examples of the cross-linking component of the protective layer may also be suitably used.

For example, a laser optical system or an LED array is used as the exposing device 14.

The developing device 16 is a developing device that allows a developer holding member having a developer layer formed on the surface thereof to come in contact with or to get close to the image holding member 10 and attach the toner to the latent image on the surface of the image holding member to form a toner image. The developing method of the developing device 16 suitably employs a known developing method using a two-component developer. Examples of the developing method using the two-component developer include a cascade method and a magnetic brush method.

The transfer device 18 may employ any of a non-contact-type transfer method, for example, using a corotron and a contact-type transfer method of bringing a conductive transfer roller into contact with the image holding member 10 with a recording medium P interposed therebetween and transferring the toner image to the recording medium P.

The cleaning device 20 is a member bringing, for example, a cleaning blade into direct contact with the surface of the image holding member 10 to remove the toner, paper powder, and dust attached to the surface. In the cleaning device 20, a cleaning brush, a cleaning roller, or the like may be used instead of the cleaning blade.

As the fixing device 22, a thermal fixing device using a heating roller is suitably used. The thermal fixing device includes, for example, a fixing roller in which a heater lamp for heating is provided in a cylindrical core and a heat-resistant resin coating film layer or a heat-resistant rubber coating film layer forms a so-called release layer on an outer circumferential surface of the heater lamp, and a pressure roller or a pressure belt that is disposed to be brought into contact with the fixing roller at a specific contact pressure and has a heat-resistant elastomer layer formed on an outer circumferential surface of a cylindrical core or a surface of a belt-like base material. A process of fixing an unfixed toner image includes, for example, inserting a recording medium P to which an unfixed toner image is transferred between the fixing roller and the pressure roller or the pressure belt to conduct fixing by thermofusion of the binder resin, additives and the like in the toner.

The image forming apparatus 101 according to the exemplary embodiment is not limited to the above-described configuration and may be an intermediate transfer type image forming apparatus using an intermediate transfer body or a so-called tandem type image forming apparatus in which image forming units forming toner images of different colors are arranged in parallel.

Meanwhile, as shown in FIG. 6, the process cartridge according to the exemplary embodiment is a process cartridge 102 in which the image holding member 10, the charging device 12 that charges the image holding member, the developing device 16 that develops the latent image formed by the exposing device 14 with a toner to form a toner image, and the cleaning device 20 that removes the toner remaining on the surface of the image holding member 10 after the transfer are integrally combined, held, and constructed by the use of a housing 24 including an exposure opening portion 24A, a charge-removing exposure opening portion 24B, and an attachment rail 24C in the image forming apparatus shown in FIG. 5. The process cartridge 102 is detachably attached to the image forming apparatus 101 shown in FIG. 5.

EXAMPLES

The invention will be further described in more detail with reference to examples, but the invention is not limited to the following examples. Unless otherwise noted, "part(s)" means "part(s) by weight".

Example 1

Manufacturing of Charging Roller

Preparation of Base Material

A base material formed of SUM 23L is electroless nickel plated to a thickness of 5 and then a hexavalent chromic acid is applied thereto to obtain a conductive base material with a diameter of 8 mm.

Formation of Adhesive Layer

Next, the following mixture is mixed for 1 hour using a ball mill, and then brush coating is performed to form an adhesive layer having a thickness of 20 μm on a surface of the base material.

Chlorinated polypropylene resin (chlorinated maleic anhydride polypropylene resin: SUPERCHLON 930 manufactured by Nippon Paper Industries Co., Ltd.): 100 parts Epoxy resin (EP4000 manufactured by Adeka Corporation): 10 parts
Conducting agent (carbon black: Ketjen black EC manufactured by Ketjen Black International Co., Ltd.): 2.5 parts The viscosity thereof is adjusted using toluene or xylene.

Formation of Elastic Layer

A mixture for an elastic layer having the following composition is kneaded using an open roller to form an elastic layer on a surface of the base material having the adhesive layer formed thereon using an extrusion molding machine, and vulcanization is performed thereon. At this time, an overall size of a base material (shaft) transport path is 8 mmφ. A base material having an outer diameter of 8 mmφ and a length of 350 mm is used. As a cross head extrusion device, a 40 mm extruder manufactured by Mitsuba Mfg. Co., Ltd. and a cross head die having a die nozzle inner diameter of 13 mmφ are used.

Clogging does not occur in the base material during extrusion molding. The coefficient of friction of the adhesive layer at that time is 0.67. The gel fraction of the adhesive layer is shown in Table 1.

Rubber material (epichlorohydrin-ethyleneoxide-allylglycidylether copolymer rubber: Gechron 3106 manufactured by Zeon Corporation): 100 parts
Conducting agent (carbon black: ASAHI Thermal manufactured by Asahi Carbon Co., Ltd.): 15 parts
Conducting agent (Ketjen black EC manufactured by Ketjen Black International Co., Ltd.): 5 parts
Ion conducting agent (lithium perchlorate): 1 part
Vulcanizing agent (Sulfur 200 Mesh, manufactured by Tsurumi Chemical Industry Co., Ltd.): 1 part
Vulcanization accelerator (Nocceler DM, manufactured by Ouchi Shinko Chemical Industrial Co., Ltd.): 2.0 parts
Vulcanization accelerator (Nocceler TT, manufactured by Ouchi Shinko Chemical Industrial Co., Ltd.): 0.5 part
Vulcanization accelerating aid (Zinc Oxide, First Class Zinc Oxide, manufactured by Seido Chemical Industry Co., Ltd.): 3 parts
Stearic Acid: 1.5 parts Example 2

The base material is prepared and the adhesive layer is formed in the same manner as in Example 1, except that the composition of the adhesive layer of Example 1 is changed as follows.

Formation of Adhesive Layer

Chlorinated polypropylene resin (chlorinated maleic anhydride polypropylene resin: SUPERCHLON 803MW manufactured by Nippon Paper Industries Co., Ltd.): 100 parts
Epoxy resin: bisphenol A type epoxy resin (jER828 manufactured by Mitsubishi Chemical Corporation): 10 parts
Conducting agent (carbon black: Ketjen Black EC, manufactured by Ketjen Black International Co.): 2.5 parts The viscosity is adjusted using toluene or xylene.

Formation of Elastic Layer

A mixture for an elastic layer having the following composition is kneaded using an open roller to form an elastic layer on a surface of the base material having the adhesive layer formed thereon using an extrusion molding machine, and vulcanization is performed thereon. At this time, an overall size of a base material (shaft) transport path is 8 mmφ. A base material having an outer diameter of 7.98 mmφ and a length of 350 mm is used. As a cross head extrusion device, a 40 mm extruder manufactured by Mitsuba Mfg. Co., Ltd. and a cross head die having a die nozzle inner diameter of 13=0 are used.

Clogging does not occur in the base material during extrusion molding. The coefficient of friction of the adhesive layer at that time is 0.69. The gel fraction of the adhesive layer is shown in Table 1.

Rubber material (epichlorohydrin-ethyleneoxide-allylglycidylether copolymer rubber: Gechron 3106 manufactured by Zeon Corporation): 100 parts
Conducting agent (carbon black: ASAHI Thermal manufactured by Asahi Carbon Co., Ltd.): 15 parts
Conducting agent (Ketjen black EC manufactured by Ketjen Black International Co., Ltd.): 5 parts
Ion conducting agent (lithium perchlorate): 1 part
Vulcanizing agent (Sulfur 200 Mesh, manufactured by Tsurumi Chemical Industry Co., Ltd.): 1 part
Vulcanization accelerator (Nocceler DM, manufactured by Ouchi Shinko Chemical Industrial Co., Ltd.): 2.0 parts
Vulcanization accelerator (Nocceler TT, manufactured by Ouchi Shinko Chemical Industrial Co., Ltd.): 0.5 part
Vulcanization accelerating aid (Zinc Oxide, First Class Zinc Oxide, manufactured by Seido Chemical Industry Co., Ltd.): 3 parts
Stearic Acid: 1.5 parts Example 3

The base material is prepared and the adhesive layer is formed in the same manner as in Example 1, except that the composition of the adhesive layer of Example 1 is changed as follows.

Formation of Adhesive Layer

Bayhydrol VPLS2058 (manufactured by Sumitomo Bayer Urethane Co., Ltd.) 100 parts
Isocyanate resin: Bayhydur 3100 (manufactured by Sumitomo Bayer Urethane Co., Ltd.): 10 parts
Conducting agent (carbon black: ASAHI Thermal manufactured by Asahi Carbon Co., Ltd.): 15 parts The viscosity thereof is adjusted using toluene or xylene.

Formation of Elastic Layer

A mixture for an elastic layer having the following composition is kneaded using an open roller to form an elastic layer on a surface of the base material having the adhesive layer formed thereon using an extrusion molding machine, and vulcanization is performed thereon. At this time, an overall size of a base material (shaft) transport path is 8 amp. A base material having an outer diameter of 7.98 mmφ and a length of 350 mm is used. As a cross head extrusion device, a 40 mm extruder manufactured by Mitsuba Mfg. Co., Ltd. and a cross head die having a die nozzle inner diameter of 13 mmφ are used.

Clogging does not occur in the base material during extrusion molding. The coefficient of friction of the adhesive layer at that time is 0.3. The gel fraction of the adhesive layer is shown in Table 1.

Rubber material (epichlorohydrin-ethyleneoxide-allylglycidylether copolymer rubber: Gechron 3106 manufactured by Zeon Corporation): 100 parts
Conducting agent (carbon black: ASAHI Thermal manufactured by Asahi Carbon Co., Ltd.): 15 parts
Conducting agent (Ketjen black EC manufactured by Ketjen Black International Co., Ltd.): 5 parts
Ion conducting agent (lithium perchlorate): 1 part
Vulcanizing agent (Sulfur 200 Mesh, manufactured by Tsurumi Chemical Industry Co., Ltd.): 1 part Vulcanization accelerator (Nocceler DM, manufactured by Ouchi Shinko Chemical Industrial Co., Ltd.): 2.0 parts Vulcanization accelerator (Nocceler TT, manufactured by Ouchi Shinko Chemical Industrial Co., Ltd.): 0.5 part Vulcanization accelerating aid (Zinc Oxide, First Class Zinc Oxide, manufactured by Seido Chemical Industry Co., Ltd.): 3 parts Stearic Acid: 1.5 parts

Example 4

The base material is prepared and the adhesive layer is formed in the same manner as in Example 1, except that the composition of the adhesive layer of Example 1 is changed as follows.

Formation of Adhesive Layer

Acrylic resin: Bayhydrol VPLS2058 (manufactured by Sumitomo Bayer Urethane Co., Ltd.) 100 parts Epoxy resin: Adeka Resin EP4100 (manufactured by Adeka Corporation): 10 parts Conducting agent (Ketjen black EC: manufactured by Ketjen Black International Co., Ltd.): 15 parts The viscosity thereof is adjusted using toluene or xylene.

Formation of Elastic Layer

A mixture for an elastic layer having the following composition is kneaded using an open roller to form an elastic layer on a surface of the base material having the adhesive layer formed thereon using an extrusion molding machine, and vulcanization is performed thereon. At this time, an overall size of a base material (shaft) transport path is 8 mmϕ. A base material having an outer diameter of 7.98 mmϕ and a length of 350 mm is used. As a cross head extrusion device, a 40 mm extruder manufactured by Mitsuba Mfg. Co., Ltd. and a cross head die having a die nozzle inner diameter of 13 mmϕ are used.

Clogging does not occur in the base material during extrusion molding. The coefficient of friction of the adhesive layer at that time is 0.88. The gel fraction of the adhesive layer is shown in Table 1.

Rubber material (epichlorohydrin-ethyleneoxide-allylglycidylether copolymer rubber: Gechron 3106 manufactured by Zeon Corporation): 100 parts Conducting agent (carbon black: ASAHI Thermal manufactured by Asahi Carbon Co., Ltd.): 15 parts Conducting agent (Ketjen black EC manufactured by Ketjen Black International Co., Ltd.): 5 parts Ion conducting agent (lithium perchlorate): 1 part Vulcanizing agent (Sulfur 200 Mesh, manufactured by Tsurumi Chemical Industry Co., Ltd.): 1 part Vulcanization accelerator (Nocceler DM, manufactured by Ouchi Shinko Chemical Industrial Co., Ltd.): 2.0 parts Vulcanization accelerator (Nocceler TT, manufactured by Ouchi Shinko Chemical Industrial Co., Ltd.): 0.5 part Vulcanization accelerating aid (Zinc Oxide, First Class Zinc Oxide, manufactured by Seido Chemical Industry Co., Ltd.): 3 parts Stearic Acid: 1.5 parts

Comparative Example 1

Manufacturing of Charging Roller

The base material is prepared and the adhesive layer is formed in the same manner as in Example 1, except that the composition of the adhesive layer of Example 1 is changed as follows.

Formation of Adhesive Layer

Polyolefin resin composition (manufactured by LORD Corporation): 100 parts

Conducting agent (carbon black: Ketjen Black EC, manufactured by Ketjen Black International Co.): 2.5 parts The viscosity is adjusted using toluene or xylene.

Formation of Elastic Layer

A mixture for an elastic layer having the following composition is kneaded using an open roller to form an elastic layer on a surface of the base material having the adhesive layer formed thereon using an extrusion molding machine, and vulcanization is performed thereon. At this time, an overall size of a base material (shaft) transport path is 8 mmϕ. A base material having an outer diameter of 7.98 mmϕ and a length of 350 mm is used. As a cross head extrusion device, a 40 mm extruder manufactured by Mitsuba Mfg. Co., Ltd. and a cross head die having a die nozzle inner diameter of 13 mmϕ are used.

Clogging does not occur in the base material during extrusion molding. The coefficient of friction of the adhesive layer at that time is 0.69. The gel fraction of the adhesive layer is shown in Table 1.

Rubber material (epichlorohydrin-ethyleneoxide-allylglycidylether copolymer rubber: Gechron 3106 manufactured by Zeon Corporation): 100 parts Conducting agent (carbon black: ASAHI Thermal manufactured by Asahi Carbon Co., Ltd.): 15 parts Conducting agent (Ketjen black EC manufactured by Ketjen Black International Co., Ltd.): 5 parts Ion conducting agent (lithium perchlorate): 1 part Vulcanizing agent (Sulfur 200 Mesh, manufactured by Tsurumi Chemical Industry Co., Ltd.): 1 part Vulcanization accelerator (Nocceler DM, manufactured by Ouchi Shinko Chemical Industrial Co., Ltd.): 2.0 parts Vulcanization accelerator (Nocceler TT, manufactured by Ouchi Shinko Chemical Industrial Co., Ltd.): 0.5 part Vulcanization accelerating aid (Zinc Oxide, First Class Zinc Oxide, manufactured by Seido Chemical Industry Co., Ltd.): 3 parts Stearic Acid: 1.5 parts Evaluation Measurement of Gel Fraction The measurement of the gel fraction of the surface layer is performed based on JIS-K6796 (1998). 1 part by weight of the adhesive layer of the charging roller is cut out to measure the weight. This is set as the weight of the resin before solvent extraction. After dissolving and immersing the cut-out adhesive layer in a solution, toluene (10 parts by weight) for 24 hours, filtration is performed and a residual resin coated material is removed, and the weight thereof is measured. This weight is set as the weight after extraction. Accordingly, the gel fraction is calculated with the following equation.

$$\text{Gel fraction (\%)} = ((\text{weight after extraction})/(\text{weight of resin before solvent extraction})) \times 100$$

Surface Condition of Base Material

After the charging roller is kept in a high-temperature and high-humidity environment (45° C., 95% RH) for 10 days, the surface condition thereof is observed and the elastic layer including the surface layer is peeled off to observe the surface of the base material. The results are shown in Table 1.

A: There is no difference from the surface condition before forming the elastic layer.

B: Pin holes are observed in at least one of the adhesive layer and the conductive support member.

C: The conductive support member is corroded and swelled and peeling is observed in at least one of the adhesive layer and the conductive support member.

Adhesiveness

In order to check the adhesive strength of the adhesive layer, a cut is formed in the elastic layer portion of the charging roller using a cutter and peeling of the elastic layer is attempted by hand.

A: The peeling does not easily occur due to the strong adhesion or the breaking of the elastic layer is observed.

B: Although resistance is present at the interface between the conductive support member and the adhesive layer or at the interface between the adhesive layer and the elastic layer, they are peeled off.

C: The peeling easily occurs at the interface between the conductive support member and the adhesive layer or the interface between the adhesive layer and the elastic layer.

Initial Image Quality

The charging roller is mounted as a charging roller on a drum cartridge of a color copier DocuCentre Color a450 (manufactured by Fuji Xerox Co., Ltd.) and a 50% halftone image is printed using DocuCentre Color a450 in the environment of 10° C. and 15% RH and in the environment of 28° C. and 85% RH. The obtained halftone images are evaluated with the following criteria.

A: Density unevenness, white points, and color points are not observed.

B: Density unevenness, white points, and color points are partially observed.

C: Density unevenness, white points, and color points are entirely observed.

Charging Maintainability

The charging roller is mounted on a drum cartridge of DocuCentre Color 400CP (manufactured by Fuji Xerox Co., Ltd.), and a print test is carried out with 50,000 A4-sized sheets (50,000 sheets in the environment of 10° C. and 15% RH). Then, with image density unevenness that is caused when a 50% halftone image is printed using DocuCentre Color 400CP, determination is performed based on the following criteria.

A: No image density unevenness is observed.

B: Image density unevenness is partially observed.

C: Image density unevenness is entirely observed.

Form Accuracy

The form after molding the charging roller is measured by using a laser outer diameter measuring unit, and evaluated with the following criteria.

A: No irregularities on the surface due to the peeling of the adhesive layer are observed.

B: Irregularities on the surface due to the peeling of the adhesive layer are observed but it is very slight and at an acceptable level for the image quality.

C: Great irregularities on the surface due to the peeling of the adhesive layer are observed and it is not at an acceptable level for the image quality.

TABLE 1

|  | Example 1 | Example 2 | Example 3 | Example 4 | Co. Ex. 1 |
|---|---|---|---|---|---|
| Gel fraction [%] | 95 | 80 | 50 | 50 | 30 |
| Coefficient of friction | 0.67 | 0.69 | 0.3 | 0.88 | 0.96 |
| Surface condition of base material | A | A | B | B | C |
| Adhesiveness | A | A | A | A | B |
| Initial image quality | A | A | B | B | C |
| Charging maintainability | A | A | B | B | C |
| Form accuracy | A | A | B | B | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging roller comprising:
   a conductive base material;
   a conductive adhesive layer that has a gel fraction equal to or greater than 50% on an outer circumferential surface of the base material; and
   a conductive elastic layer on the adhesive layer,
   wherein a coefficient of friction of the adhesive layer is from 0.2 to 0.9.

2. The charging roller according to claim 1,
   wherein a gel fraction of the adhesive layer is equal to or greater than 60%.

3. The charging roller according to claim 1,
   wherein a gel fraction of the adhesive layer is equal to or greater than 90%.

4. The charging roller according to claim 1,
   wherein a coefficient of friction of the adhesive layer is from 0.3 to 0.8.

5. The charging roller according to claim 1,
   wherein a coefficient of friction of the adhesive layer is from 0.4 to 0.7.

6. A process cartridge detachable from an image forming apparatus, the process cartridge comprising:
   an image holding member; and
   a charging device that charges the image holding member and includes the charging roller according to claim 1.

7. The process cartridge according to claim 6,
   wherein a gel fraction of the adhesive layer is equal to or greater than 60%.

8. The process cartridge according to claim 6,
   wherein a gel fraction of the adhesive layer is equal to or greater than 90%.

9. The process cartridge according to claim 6,
   wherein a coefficient of friction of the adhesive layer is from 0.2 to 0.9.

10. The process cartridge according to claim 6,
    wherein a coefficient of friction of the adhesive layer is from 0.3 to 0.8.

11. The process cartridge according to claim 6,
    wherein a coefficient of friction of the adhesive layer is from 0.4 to 0.7.

12. A manufacturing method of a charging roller comprising:

forming a conductive adhesive layer that has a gel fraction equal to or greater than 50% on an outer circumferential surface of a conductive base material; and supplying the base material having the adhesive layer formed thereon to a cross head, while inserting the base material into a supply path having a smaller inner diameter than an outer diameter of the base material including the adhesive layer, by using an extrusion molding machine, and applying a material for elastic layer formation onto the adhesive layer to form a conductive elastic layer, wherein a coefficient of friction of the adhesive layer is from 0.2 to 0.9.

13. The manufacturing method of a charging roller according to claim 12, wherein a gel fraction of the adhesive layer is equal to or greater than 60%.

14. The manufacturing method of a charging roller according to claim 12, wherein a gel fraction of the adhesive layer is equal to or greater than 90%.

15. The manufacturing method of a charging roller according to claim 12, wherein a coefficient of friction of the adhesive layer is from 0.3 to 0.8.

16. The manufacturing method of a charging roller according to claim 12, wherein a coefficient of friction of the adhesive layer is from 0.4 to 0.7.

* * * * *